(12) United States Patent
Huang et al.

(10) Patent No.: US 8,760,437 B2
(45) Date of Patent: Jun. 24, 2014

(54) SENSING SYSTEM

(75) Inventors: Yu-Hao Huang, Hsinchu County (TW); Hsin-Chia Chen, Hsinchu County (TW); Tzung-Min Su, Hsinchu County (TW); Chih-Hsin Lin, Hsinchu County (TW); Ren-Hau Gu, Hsinchu County (TW); Chih-Hung Lu, Hsinchu County (TW)

(73) Assignee: Pixart Imaging Inc., Hsinchu County (TW)

( * ) Notice: Subject to any disclaimer, the term of this patent is extended or adjusted under 35 U.S.C. 154(b) by 552 days.

(21) Appl. No.: 13/186,394

(22) Filed: Jul. 19, 2011

(65) Prior Publication Data

US 2012/0205166 A1  Aug. 16, 2012

(30) Foreign Application Priority Data

Feb. 11, 2011 (TW) .............................. 100104649 A (51) Int. Cl.
   *G09G 5/00* (2006.01)
(52) U.S. Cl.
   USPC ...................................... 345/175; 178/18.09
(58) Field of Classification Search
   CPC ..... G06F 3/042; G06F 3/0421; G06F 3/0428; G06F 2203/04104
   USPC ................................ 345/173, 175; 178/18.09
   See application file for complete search history.

(56) References Cited

U.S. PATENT DOCUMENTS

| 4,553,842 A | 11/1985 | Griffin |
| 2009/0277694 A1 | 11/2009 | Hansen et al. |
| 2011/0061950 A1* | 3/2011 | Cheng et al. ................ 178/18.09 |
| 2011/0109565 A1* | 5/2011 | Zhu et al. ....................... 345/173 |

FOREIGN PATENT DOCUMENTS

| CN | 101609381 A | 12/2009 |
| JP | 2009199259 A | 9/2009 |
| TW | M379804 | 5/2010 |
| TW | 201131448 | 9/2011 |
| TW | I397847 B | 6/2013 |

OTHER PUBLICATIONS

Intellectual Property Office, Ministry of Economic Affairs, R.O.C., "Office Action", Oct. 24, 2013, Taiwan.

* cited by examiner

*Primary Examiner* — Regina Liang
(74) *Attorney, Agent, or Firm* — Morris Manning & Martin LLP; Tim Tingkang Xia, Esq.

(57) ABSTRACT

A sensing system includes a complex reflector and an image sensor, in which the complex reflector is disposed on one side of a flat panel. The complex reflector includes a first section and a second section which are stacked, in which the first section provides a mirror image and a real image, and the second section provides a real image. The image sensor is used to capture an image generated by an object when touching a surface of the flat panel, and in the image captured by the image sensor, the object simultaneously generates a first object image in an image region corresponding to the second section and an image region corresponding to the first section, and generates a second object image in the image region corresponding to the first section.

23 Claims, 8 Drawing Sheets

SENSING SYSTEM

CROSS-REFERENCE TO RELATED APPLICATIONS

This non-provisional application claims priority under 35 U.S.C. §119(a) on Patent Application No(s). 100104649 filed in Taiwan, R.O.C. on Feb. 11, 2011, the entire contents of which are hereby incorporated by reference.

BACKGROUND OF THE INVENTION

1. Field of Invention

The present invention relates to a sensing system, and more particularly to a sensing system applicable to a touch panel.

2. Related Art

With the rapid development of the touch-control technology in recent years, the touch-control technology has been widely used in input of portable touch-control electronic products such as computers, mobile phones, and gaming devices, and the user can control an electronic device directly and quickly only by directly clicking an instruction on the touch panel with a finger or touch pen, or by performing mobile writing on the touch panel with the finger or touch pen.

In order to enable the operating system of the electronic device to successfully identify the instruction sent by the user on the touch panel, the existing sensing manner is mainly detecting a touch point in an optical manner.

By taking US patent No. US2009/0277694 (hereinafter referred to as '694) as an example, a plurality of image sensors, a plurality of light sources, and a plurality of reflectors are disposed around the touch panel of the optical touch device disclosed in '694. The image sensors are electrically connected to a processor, when an object blocks light emitted from the light source, the object forms an image on the reflector, the image sensor captures the image on the reflector, so that an image signal received by the image sensor changes, and the image sensor converts such an image signal into a corresponding electrical signal to be transmitted to the processor, so as to make the processor judge and calculate an actual location of the object.

If more than two objects are operated on the touch panel, the above conventional technology will derive the problem that the touch system cannot identify a plurality of real images and virtual images formed by the more than two objects on the reflectors, which results in that it takes a too long time for the processor of the conventional touch system to judge and calculate actual locations of the objects, and even the problem that the actual locations of the objects are judged incorrectly.

SUMMARY OF THE INVENTION

In view of the above problems, the present invention is a sensing system, so as to solve the problem that the conventional touch system cannot identify a plurality of real images and virtual images formed by more than two objects on the reflectors, which results in that it takes a too long time to judge and calculate actual locations of the objects, and even the problem that the actual locations are judged incorrectly.

A sensing system according to the present invention comprises a complex reflector and an image sensor. The complex reflector is disposed on at least one side of a flat panel, and comprises a first section and a second section which are stacked, in which the first section provides a mirror image and a real image, and the second section provides a real image. The image sensor is adjacent to the flat panel, and when the image sensor captures an image generated by an object touching a surface of the flat panel, in the image captured by the image sensor, the object simultaneously generates a first object image in an image region corresponding to the first section and an image region corresponding to the second section, and generates a second object image in the image region corresponding to the first section.

Another sensing system according to the present invention comprises a complex reflector and two image sensors. The complex reflector is disposed on at least one side of a flat panel, and comprises a first section and a second section which are stacked, in which the first section provides a mirror image and a real image, and the second section provides a real image. The two image sensors are adjacent to the flat panel, and when the two image sensors capture an image generated by an object touching a surface of the flat panel respectively, in the image captured by the two image sensors, the object simultaneously generates a first object image in an image region corresponding to the first section and an image region corresponding to the second section, and generates a second object image in the image region corresponding to the first section.

A yet another sensing system according to the present invention comprises two complex reflectors and an image sensor. The two complex reflectors are disposed on at least two sides of a flat panel respectively, and respectively comprise a first section and a second section which are stacked, in which the first section provides a mirror image and a real image, and the second section provides a real image. The image sensor is adjacent to the flat panel, and when the image sensor captures an image generated by an object touching a surface of the flat panel, in the image captured by the image sensor, the object simultaneously generates a first object image in an image region corresponding to the first section and the second section of one of the two complex reflectors, generates a second object image in the image region corresponding to the first section one of the two complex reflector, and generates a third object image in the image region corresponding to the first section of the other complex reflector.

The efficacy of the present invention lies in enabling the object to generate different object images on the second section and/or the first section of the complex reflector(s) correspondingly with the design of the structure of the stacked first section and second section, so as to judge the actual location of the object on the flat panel quickly.

Moreover, the configuration of the varying number of the complex reflector and the image sensor can solve the double image (or ghost) problem of the object on the complex reflector(s), so as to judge the actual location of the object more accurately.

The above description about the contents of the present invention and the following description about the embodiments are used to illustrate and interpret the principle of the present invention, and to provide further interpretation to the claims of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
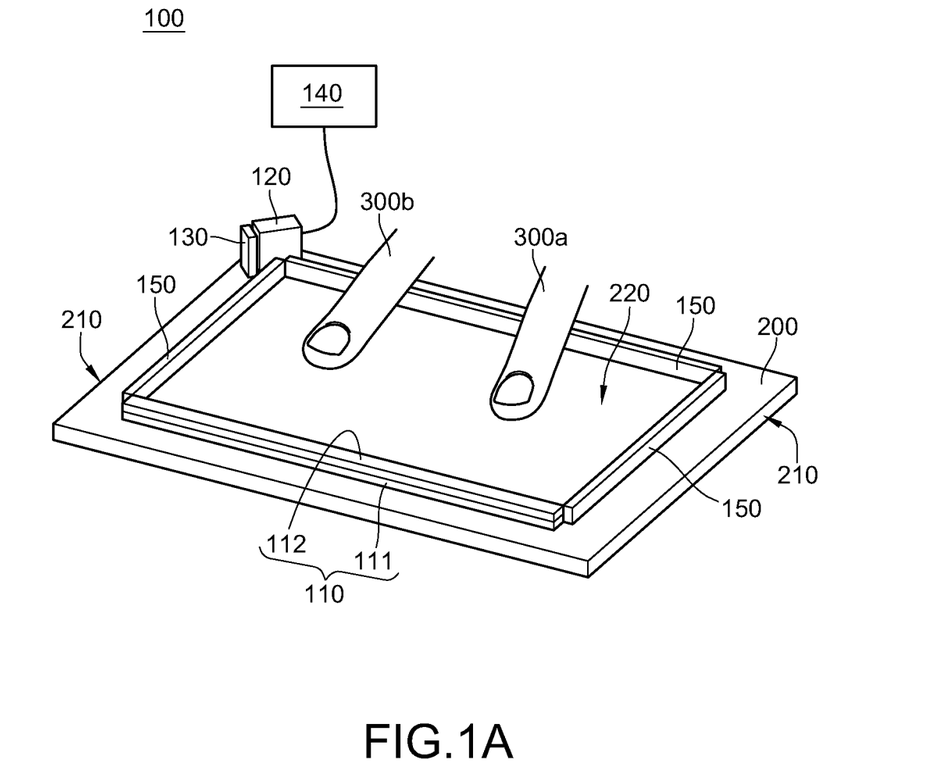
FIG. 1A is a schematic three-dimensional view of a sensing system according to a first embodiment of the present invention.
Figure 1B:
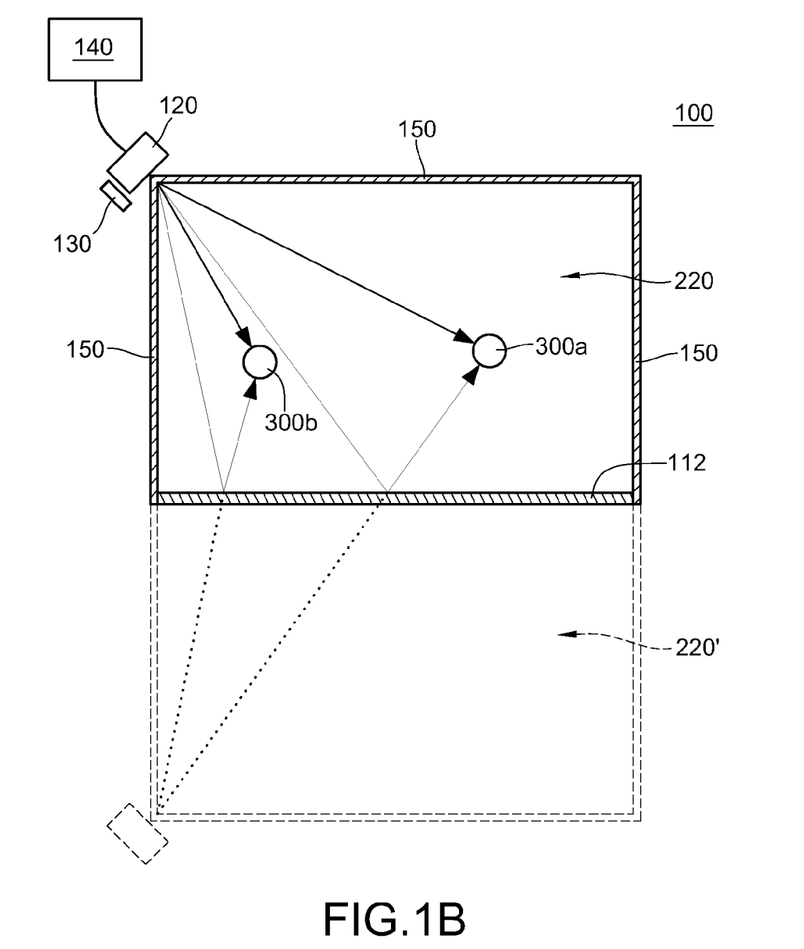
FIG. 1B is a schematic top view of the sensing system according to the first embodiment of the present invention.
Figure 1C:
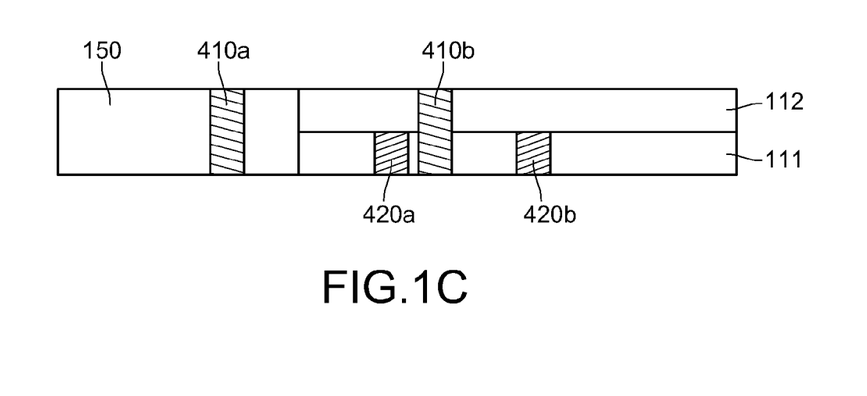
FIG. 1C is a schematic view of imaging of a complex reflector according to the first embodiment of the present invention.
Figure 2A:
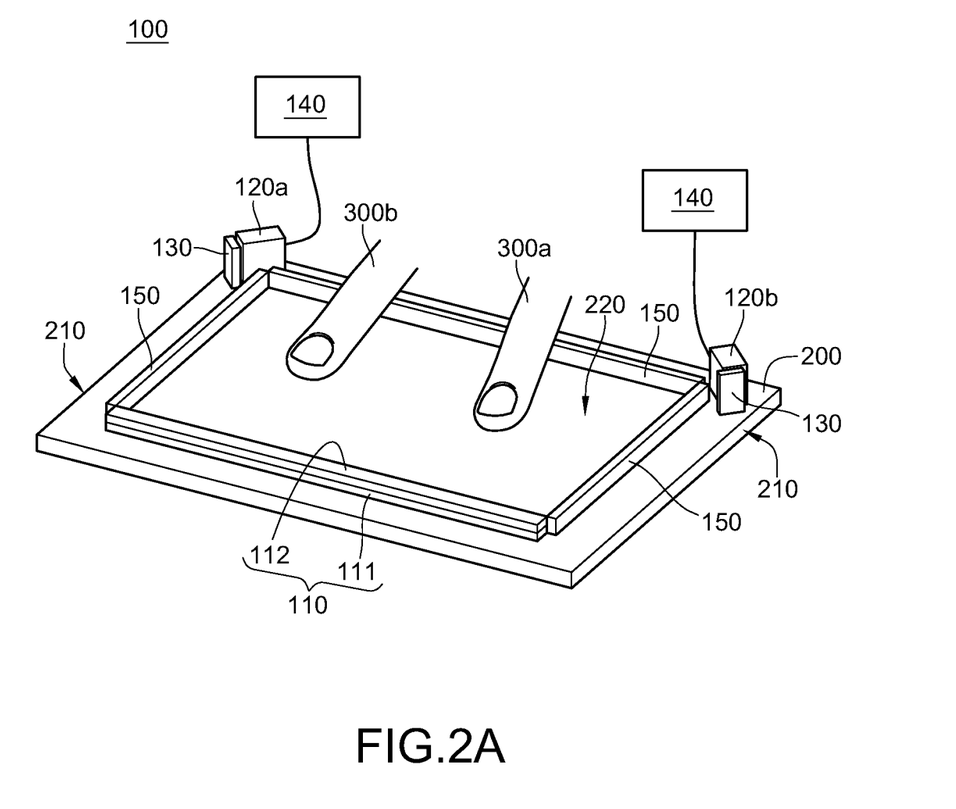
FIG. 2A is a schematic three-dimensional view of a sensing system according to a second embodiment of the present invention.
Figure 2B:
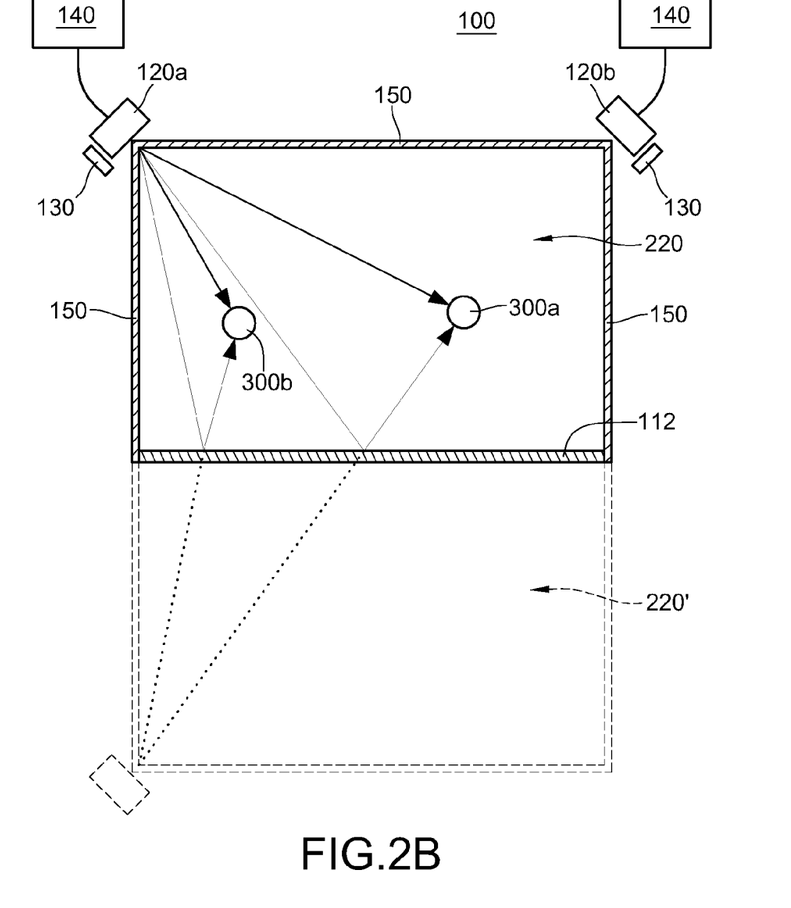
FIG. 2B is a schematic top view of the sensing system according to the second embodiment of the present invention.
Figure 2C:
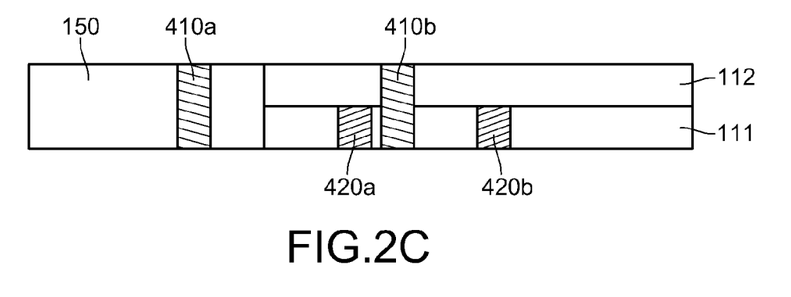
FIG. 2C is a schematic view of imaging of a complex reflector according to the second embodiment of the present invention.
Figure 2D:
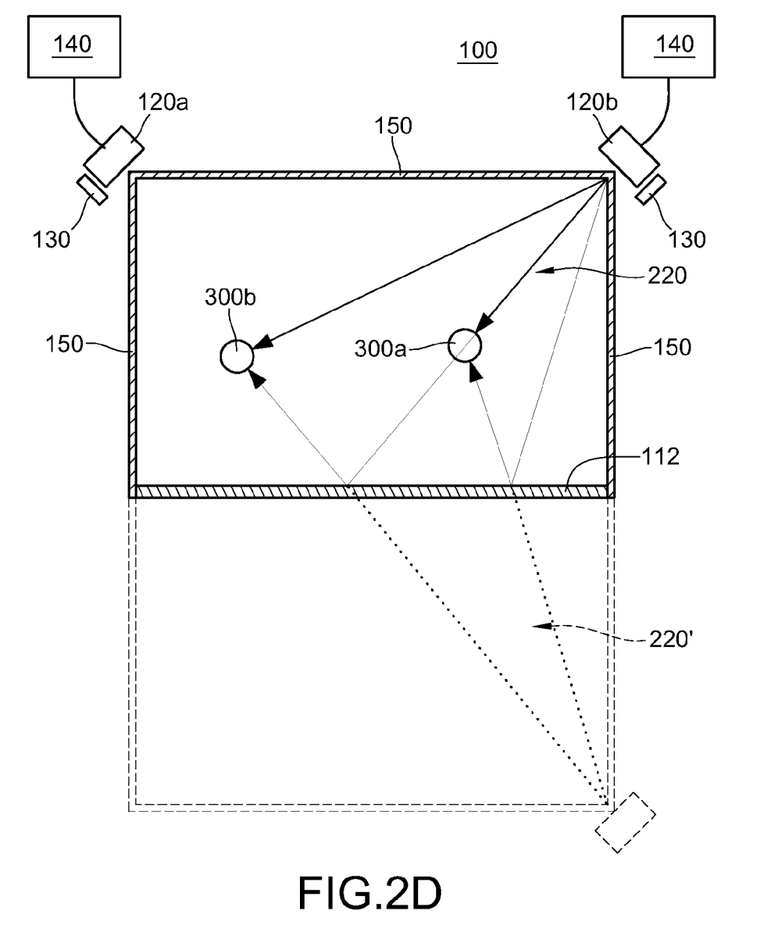
FIG. 2D is a schematic top view of the sensing system according to the second embodiment of the present invention.
Figure 2E:
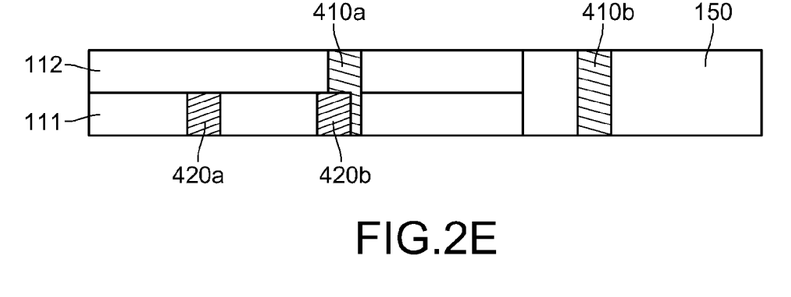
FIG. 2E is a schematic view of imaging of the complex reflector according to the second embodiment of the present invention.

FIG. 1A, FIG. 1B and FIG. 1C are respectively a schematic three-dimensional view, a schematic top view of a sensing system 100 and a schematic view of imaging of a complex reflector according to a first embodiment. As shown in FIG. 1A, FIG. 1B and FIG. 1C, the sensing system of the present invention is applicable to a touch system. The touch system comprises a flat panel 200, where the flat panel 200 is, for example, a whiteboard or a touch panel. The flat panel 200 is substantially a rectangular platy structure, and thus the flat panel 200 comprises four sides 210. A first operating region 220 is defined on a surface of the flat panel 200, so as to allow two objects 300a and 300b, for example, touch pens or a user's fingers, to perform touch-control on the first operating region 220.

It should be noted that, the shape of the flat panel 200 in this embodiment is not limited to the rectangular structure described in this embodiment, and persons skilled in the art can design the appearance of the flat panel 200 to be any appropriate geometric shape, as long as the shape does not affect the function and effect of the flat panel 200.

Additionally, two objects 300a and 300b are utilized to explain this embodiment, but this embodiment is also applicable to operation of a single object or operation of more than two objects.

As shown in FIG. 1A, FIG. 1B, and FIG. 1C, the sensing system 100 according to the first embodiment comprises a complex reflector 110, an image sensor 120, a light source 130, a processor 140, and at least one reflecting unit 150. The complex reflector 110 is disposed on one side 210 of the flat panel 200, and comprises a first section 111 and a second section 112 stacked on the first section 111, in which the second section 112 is disposed facing the flat panel 200, and the first section 111 of the complex reflector 110 is located between the second section 112 and the flat panel 200. The first section 111 of the complex reflector 110 may be a mirror, and the second section 112 may be a retro-reflector or light guide bar. Therefore, when an object forms an image on the complex reflector 110, the first section 111 is capable of generating a mirror image and a real image, and the second section 112 is capable of generating a real image. In other words, in pictures captured by the image sensor 120, the mirror images and the real images of the objects 300a and 300b both can be formed on the first section 111 of the pictures, and only the real images of the objects 300a and 300b can appear in the second section 112 of the pictures. A second operating region 220' is formed since the first section 111 of the complex reflector 110 mirrors the first operating region 220. In this embodiment, the second section 112 is stacked on the first section 111. However, such a stacking manner is not used to limit the present invention. In one or some embodiments, the second section 112 can also be configured between the first section 111 and the flat panel 200.

The image sensor 120 in this embodiment is an optical sensor, for example, a charged coupled device (CCD) or complementary metal-oxide semiconductor (CMOS), but the present invention is not limited to this. The image sensor 120 is adjacent to the flat panel 200, and faces the flat panel 200, so as to capture an optical image of the objects 300a and 300b when the objects move on the first operating region 220 of the surface of the flat panel 200. The processor 140 is electrically connected to the image sensor 120, so as to receive and process an image signal transmitted by the image sensor 120.

Referring to FIG. 1A to FIG. 1C, the light source 130 in this embodiment may be a light-emitting device such as a light emitting diode (LED) or laser diode, for emitting light along specific direction, but the present invention is not limited to this. The light source 130 is respectively adjacent to the flat panel 200 and the image sensor 120 and capable of emitting light to the objects 300a and 300b for forming an image.

The reflecting units 150 may be retro-reflectors or light guide bars, which is not limited to this embodiment. The reflecting units 150 are disposed on other sides 210 of the flat panel 200 on which no complex reflector 110 is disposed, and the reflecting units 150 can assist in improving uniformity of the light emitted by the light source 130 on the surface of the flat panel 200.

As shown in FIG. 1A to FIG. 1C, when the two objects 300a and 300b touch the first operating region 220 of the surface of the flat panel 200 and the light source 130 emits light to the two objects 300a and 300b, images of the objects 300a and 300b are respectively generated on the reflecting units 150 and the complex reflector 110. In detail, in the pictures captured by the image sensor 120, the object 300a generates a first object image 410a on the reflecting units 150, and generates a second object image 420a on the first section 111 of the complex reflector 110. Additionally, in the pictures captured by the image sensor 120, the object 300b generates a first object image 410b on the first section 111 and the second section 112 of the complex reflector 110, and generates a second object image 420b on the first section 111.

After the image sensor 120 captures the first object images 410a and 410b and the second object images 420a and 420b formed by the objects 300a and 300b on the reflecting units 150 and the complex reflector 110, the image sensor 120 converts the first object images 410a and 410b and the second object images 420a and 420b into image signals to be transmitted to the processor 140, and the processor 140 processes the image signals.

In particular, since the two objects 300a and 300b block paths of the light of the light source 130 being projected to the complex reflector 110 and the reflecting units 150, the first object image 410b sheltering the image is formed on the first section 111 and the second section 112 of the complex reflector 110, and the first object image 410a sheltering the image is formed on the reflecting units 150. In other words, in the pictures captured by the image sensor 120, a dark pattern simultaneously located at the first section 111 and the second section 112 is the first object image 410b generated by the object 300b on the complex reflector 110, in which the first object image 410b is a real image. Besides, in the pictures captured by the image sensor 120, a dark pattern located at the reflecting units 150 is the first object image 410a generated by the object 300a on the reflecting units 150, in which the first object image 410a is a real image.

The second section 112 of the complex reflector 110 of the embodiment is a retro-reflector or light guide bar, so the objects 300a and 300b may not form mirror images on the second section 112. In addition, the first section 111 of the complex reflector 110 is, for example, a mirror, and thus the first section 111 can reflect light, so the two objects 300a and 300b can generate the second object images 420a and 420b at the second operating region 220' generated by the first section 111, in which the second object images 420a and 420b are both mirror images.

Therefore, when receiving image signals generated by the two first object images 410a and 410b and the two second object images 420a and 420b which have different light intensities, the processor 140 can judge that the first object images 410a and 410b are the real images of the two objects 300a and 300b, thereby calculating and determining the actual locations of the two objects 300a and 300b on the surface of the flat panel accurately.

FIG. 2A to FIG. 2E are respectively a schematic three-dimensional view and schematic top views of a sensing system and schematic views of imaging of a complex reflector according to a second embodiment. The structure in this embodiment is similar to that in the above first embodiment, and thus the following description is only directed to their differences.

As shown in FIG. 2A to FIG. 2E, the sensing system 100 according to the second embodiment comprises a complex reflector 110, two image sensors 120a and 120b, two light sources 130, a processor 140, and at least one reflecting unit 150. The complex reflector 110 is disposed on one side 210 of the flat panel 200, and comprises a first section 111 and a second section 112 stacked on the first section 111, in which the second section 112 faces the flat panel 200, and the first section 111 of the complex reflector 110 is located between the second section 112 and the flat panel 200. The first section 111 of the complex reflector 110 may be a mirror, and the second section 112 may be a retro-reflector or light guide bar. Therefore, in pictures captured by the image sensors 120a and 120b, the first section 111 is capable of providing a mirror image and a real image, and the second section 112 is capable of providing a real image. A second operating region 220' is generated via the first section 111 of the complex reflector 110 mirroring the first operating region 220. In this embodiment, the second section 112 is stacked above the first section 111. However, such a stacking manner is not used to limit the present invention. In other embodiments of the present invention, the second section 112 can also be configured below the first section 111.

The two image sensors 120a and 120b and the two light sources 130 in this embodiment are adjacent to the flat panel 200, the image sensors 120a is disposed to be adjacent to and in pair with one of the light sources 130 and the image sensor 120b is disposed to be adjacent to and in pair with the other light sources 130, and the image sensors 120a and 120b and the light sources 130 configured in pairs are respectively disposed at two opposite sides 210 of the flat panel 200.

The image sensors 120a and 120b are disposed facing the flat panel 200, the light sources 130 can emit light to the objects 300a and 300b, so as to form images, and the image sensors 120a and 120b are used to capture an optical image of the objects 300a and 300b when the objects 300a and 300b move on the first operating region 220 on the surface of the flat panel 200. The processor 140 is electrically connected to the image sensors 120a and 120b, so as to receive and process image signals transmitted by the image sensors 120a and 120b. A plurality of reflecting units 150 are disposed on other sides 210 of the flat panel 200 on which no complex reflector 110 is disposed, and the reflecting units 150 can assist in improving uniformity of the light emitted by the light sources 130 on the surface of the flat panel 200.

As shown in FIG. 2B to FIG. 2E, an image sensor 120a captures first object images 410a and 410b and second object images 420a and 420b formed by a first reflecting object 110, and then converts the images into image signals to be transmitted to the processor 140, and the other image sensor 120b also captures the first object images 410a and 410b and the second object images 420a and 420b formed by the first reflecting object 110, and then converts the images into image signals to be transmitted to the processor 140.

When receiving image signals generated by the two first object images 410a and 410b and the two second object images 420a and 420b which have different light intensities and are respectively transmitted by the two image sensors 120a and 120b, the processor 140 can judge that the first object images 410a and 410b are the real images of the two objects 300a and 300b, thereby calculating and determining the actual locations of the two objects 300a and 300b accurately. Moreover, the processor 140 can compensate for calculation of the actual locations of the objects 300a and 300b by means of the image signals transmitted by the two image sensors 120 respectively at different locations, so as to calculate and position the locations of the objects 300a and 300b more accurately, thereby solving the double image (or ghost) problem of the objects 300a and 300b on the complex reflector 110.

Figure 3A:
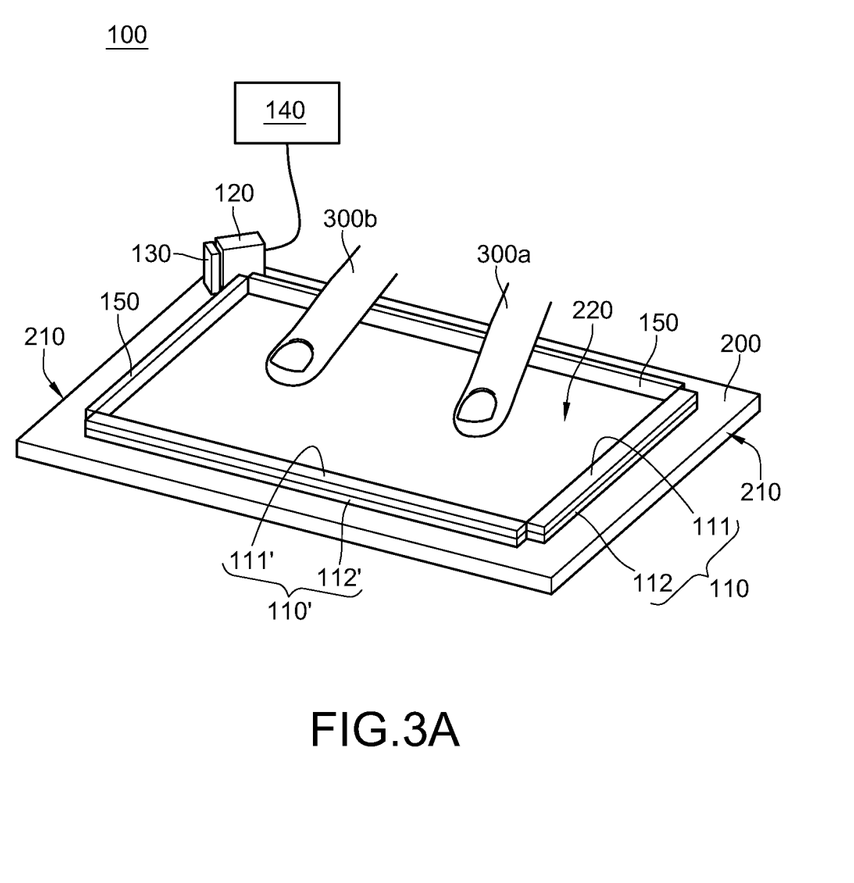
FIG. 3A is a schematic three-dimensional view of a sensing system according to a third embodiment of the present invention.
Figure 3B:
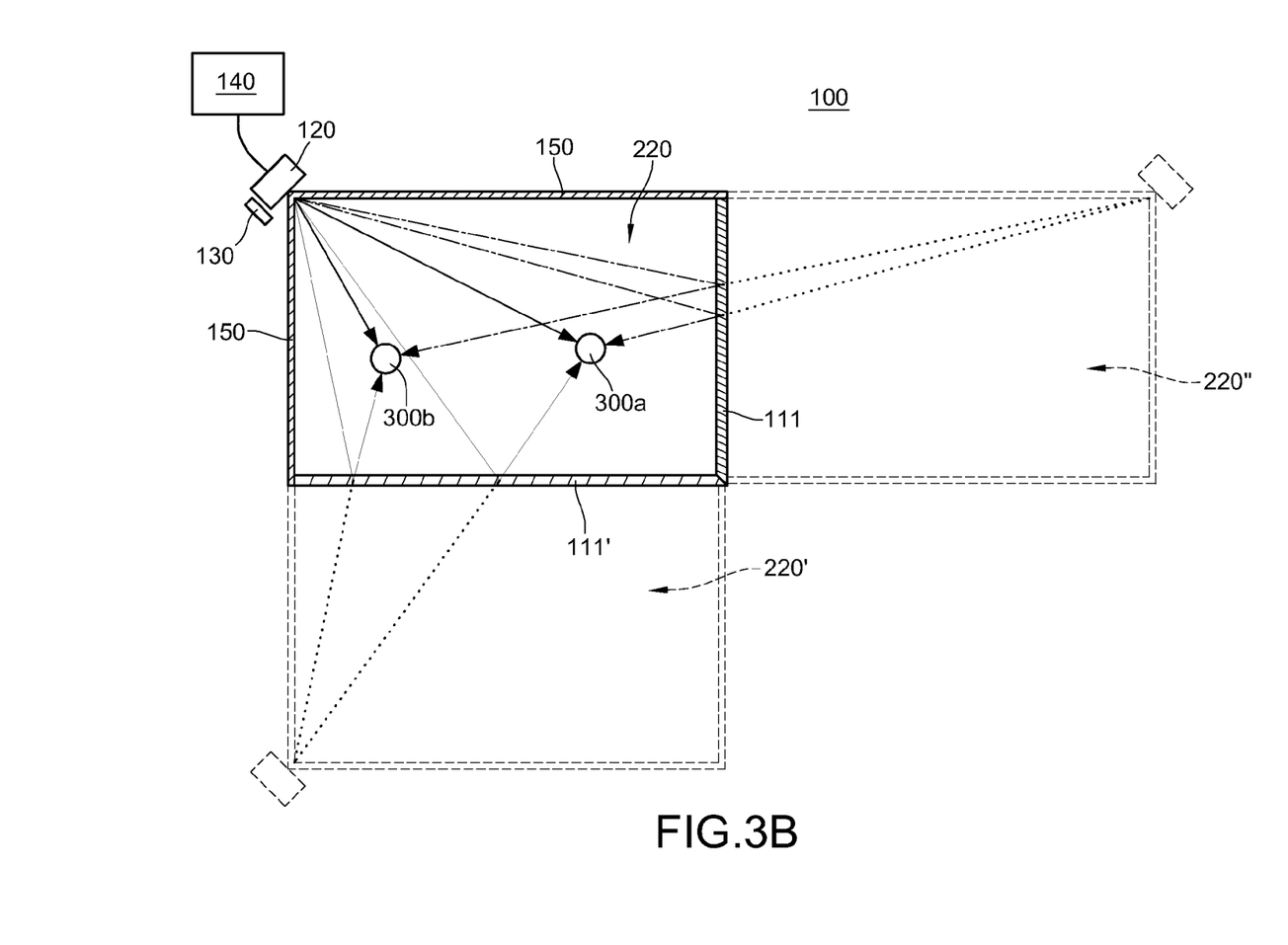
FIG. 3B is a schematic top view of the sensing system according to the third embodiment of the present invention.
Figure 3C:
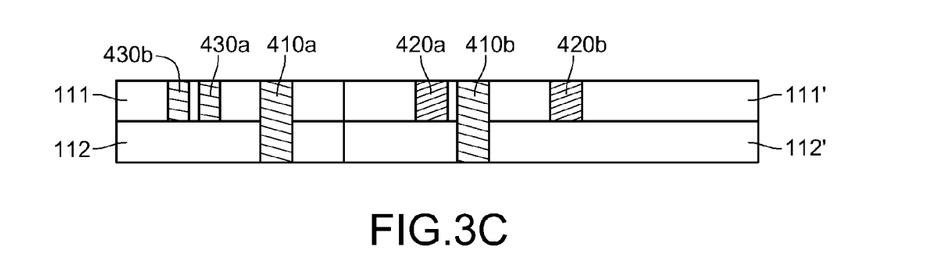
FIG. 3C is a schematic view of imaging of a complex reflector according to the third embodiment of the present invention.

FIG. 3A to FIG. 3C are respectively a schematic three-dimensional view and a schematic top view of a sensing system and a schematic view of imaging of a complex reflector according to a third embodiment. The structure in this embodiment is similar to that in the above embodiment, and thus the following description is only directed to their differences.

As shown in FIG. 3A to FIG. 3C, the sensing system 100 according to the third embodiment comprises two complex reflectors 110 and 110', an image sensor 120, a light source 130, a processor 140, and at least one reflecting unit 150. The two complex reflectors 110 and 110' are respectively disposed on two sides 210 of the flat panel 200, the two complex reflectors 110 and 110' are disposed to be adjacent to each other, and the two complex reflectors 110 and 110' are substantially perpendicular to each other.

The complex reflector 110 comprises a second section 112 and a first section 111 stacked on the second section 112. Likewise, the complex reflector 110' comprises a second section 112' and a first section 111' stacked on the second section 112'. The first sections 111 and 111' of the complex reflectors 110 and 110' may be mirrors, and the second sections 112 and 112' may be retro-reflectors or light guide bars. Therefore, either the first section 111 or the first section 111' can provide a mirror image and a real image, and either the second section 112 or the second section 112' can provide a real image. A second operating region 220' is formed via the first section 111' of the complex reflector 110' mirroring the first operating region 220. A third operating region 220" is formed via the first section 111 of the other complex reflector 110 mirroring the first operating region 220.

The image sensor 120 and the light sensor 130 in this embodiment are disposed to be adjacent to the flat panel 200, and the image sensor 120 is disposed to be adjacent to the light sensor 130 at one side 210 of the flat panel 200.

The image sensor 120 faces the flat panel 200, the light source 130 can emit light to the objects 300a and 300b, so as to form images, and the image sensor 120 is used to capture an optical image of the objects 300a and 300b when the objects move on the first operating region 220 on the surface of the flat panel 200. The processor 140 is electrically connected to the image sensor 120, so as to receive and process image signals transmitted by the image sensor 120. A plurality of reflecting units 150 are disposed on other sides 210 of the flat panel 200 on which no complex reflectors 110 and 110' are disposed, and the reflecting units 150 can assist in improving uniformity of the light emitted by the light source 130 on the surface of the flat panel 200.

As shown in FIG. 3A to FIG. 3C, when the two objects 300a and 300b touch the surface of the flat panel 200 in the first operating region 220 and the light source 130 emits light to the two objects 300a and 300b, the objects 300a and 300b may present a plurality of images in a picture shot by the image sensor 120. More particularly, the object 300a generates a first object image 410a in image regions corresponding to the second section 112 and the first section 111 of the complex reflector 110, generates a third object image 430a in an image region corresponding to the first section 111 of the complex reflector 110, and generates a second object image 420a in an image region corresponding to the first section 111' of the complex reflector 110'. Additionally, the object 300b generates a first object image 410b in image regions corresponding to the second section 112' and the first section 111' of the complex reflector 110', generates a third object image 430b in the image region corresponding to the first section 111 of the complex reflector 110, and generates a second object image 420b in the image region corresponding to the first section 111' of the complex reflector 110'.

After the image sensor 120 captures the first object images 410a and 410b, the second object images 420a and 420b, and the third object images 430a and 430b formed by the two complex reflectors 110 and 110', the image sensor 120 converts the first object images 410a and 410b, the second object images 420a and 420b, and the third object images 430a and 430b into image signals to be transmitted to the processor 140, and the processor 140 processes the image signals.

In particular, the two objects 300a and 300b block paths of the light of the light source 130 being projected onto the two complex reflectors 110 and 110', so the first object images 410a and 410b sheltering an image are formed on the first sections 111 and 111' and the second sections 112 and 112' of the two complex reflectors 110 and 110', that is, dark patterns are generated at corresponding locations of the first sections 111 and 111' and the second sections 112 and 112', in which the first object images 410a and 410b are respectively the real images of the two objects 300a and 300b.

The second sections 112 and 112' of the two complex reflectors 110 and 110' in the present invention are, for example, retro-reflectors or light guide bars, so the two objects 300a and 300b may not form mirror images on the second section 112. In addition, the first sections 111 and 111' of the two complex reflectors 110 and 110' are, for example, mirrors, and thus the first sections 111 and 111' can reflect light, so the two objects 300a and 300b can generate the third object images 430a and 430b in the third operating region 220" generated by the first section 111, and the two objects 300a and 300b can generate the second object images 420a and 420b in the second operating region 220' generated by the first section 111', in which the second object images 420a and 420b and the third object images 430a and 430b are mirror images.

Therefore, when receiving image signals generated by the first object images 410a and 410b, the second object images 420a and 420b, and the third object images 430a and 430b which have different light intensities, the processor 140 can judge that the first object images 410a and 410b are the real images of the two objects 300a and 300b, thereby calculating and determining the actual locations of the two objects 300a and 300b accurately.

Figure 3D:
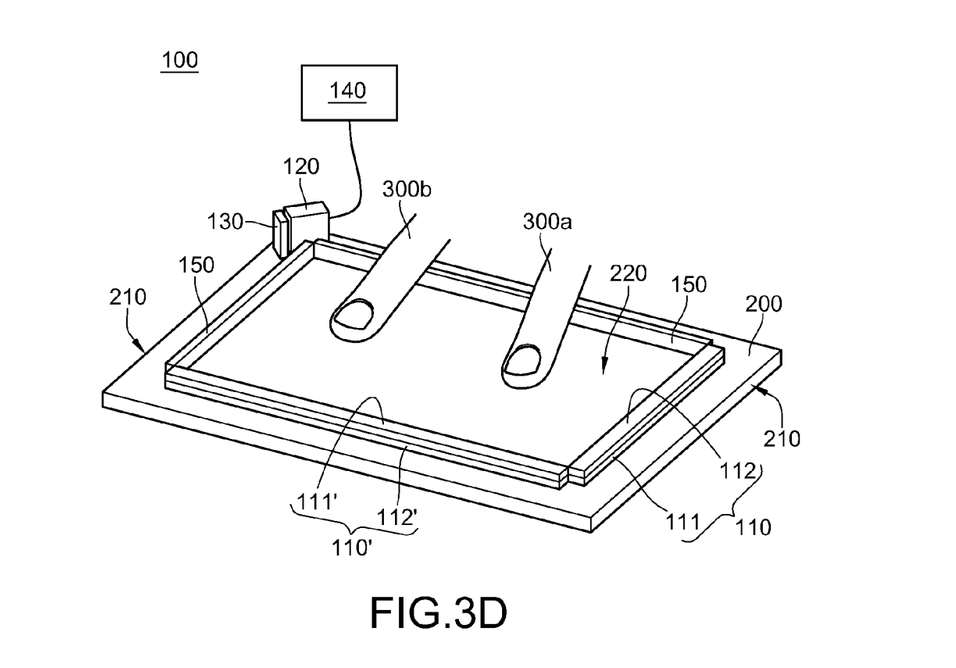
FIG. 3D is a schematic three-dimensional view of a sensing system according to a fourth embodiment of the present invention.
Figure 3E:
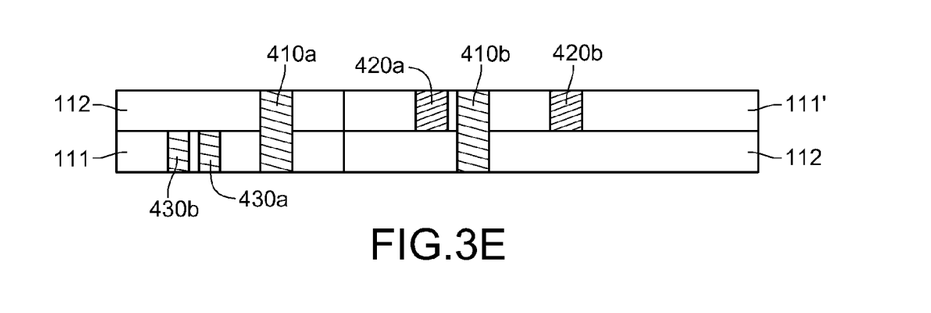
FIG. 3E is a schematic view of imaging of a complex reflector according to the fourth embodiment of the present invention.

It should be noted that, in the third embodiment, although the first sections 111 and 111' of the complex reflectors 110 and 110' are respectively located above the second sections 112 and 112', that is, the second section 112 is located between the first section 111 and the flat panel 200, and the second section 112' is located between the first section 111' and the flat panel 200, the manner of stacking the first section and the second section in the third embodiment is not used to limit the present invention. FIG. 3D to FIG. 3E are respectively a schematic three-dimensional view of a sensing system and a schematic view of imaging of a complex reflector according to a fourth embodiment. The structure in this embodiment is similar to that in the above third embodiment, and thus the following description is only directed to their differences. In the fourth embodiment, the complex reflector 110 respectively comprises a first section 111 and a second section 112 stacked on the first section 111. The complex reflector 110' respectively comprises a second section 112' and a first section 111' stacked on the second section 112'.

The complex reflector of the sensing system in the present invention comprises a first section and a second section which are stacked, and the objects generate object images having different light intensities on the second section and/or the first section of the complex reflector, so as to enable the image sensor and the processor to judge and calculate the actual locations of the objects quickly.

Moreover, the present invention can enable the processor to receive image signals transmitted by different image sensors with the design of the different number of the complex reflector and the image sensor, so as to compensate for and modify the location calculated by the processor, thereby solving the double image (or ghost) problem of the objects on the complex reflector and judge the actual locations of the objects more accurately.

What is claimed is:

1. A sensing system, comprising:
a complex reflector, disposed on at least one side of a flat panel, wherein the complex reflector comprises a first section and a second section which are stacked, the first section provides a mirror image and a real image, and the second section provides a real image; and
an image sensor, adjacent to the flat panel, wherein when the image sensor captures an image generated by an object when touching a surface of the flat panel, in the image captured by the image sensor, the object simultaneously generates a first object image in an image region corresponding to the second section and an image region corresponding to the first section, and generates a second object image in the image region corresponding to the first section.

2. The sensing system according to claim 1, further comprising a light source, wherein the light source is adjacent to the flat panel, the light source is disposed to be adjacent to the image sensor, and the light source emits light to the object, so that the object generates the first object image in the image region corresponding to the second section and the image region corresponding to the first section, and generates the second object image in the image region corresponding to the first section.

3. The sensing system according to claim 1, further comprising a processor electrically connected to the image sensor, wherein the image sensor captures the first object image and the second object image, the image sensor generates an image signal to the processor, and the processor judges that the first object image is a real image of the object.

4. The sensing system according to claim 1, further comprising at least one reflecting unit disposed on at least one side of the flat panel.

5. The sensing system according to claim 4, wherein the reflecting unit is a retro-reflector or a light guide bar.

6. The sensing system according to claim 1, wherein the second section is disposed facing the flat panel.

7. The sensing system according to claim 1, wherein the first section is a mirror, and the second section is a retro-reflector or a light guide bar.

8. A sensing system, comprising:
a complex reflector, disposed on one side of a flat panel, wherein the complex reflector comprises a first section and a second section which are stacked, the first section provides a mirror image and a real image, and the second section provides a real image; and
two image sensors, adjacent to the flat panel, wherein when the two image sensors respectively capture an image generated by an object when touching a surface of the flat panel, in the image captured by the two image sensors, the object simultaneously generates a first object image in an image region corresponding to the second section and an image region corresponding to the first section, and generates a second object image in the image region corresponding to the first section.

9. The sensing system according to claim 8, further comprising two light sources, wherein the two light sources are respectively adjacent to the flat panel, the two light sources are respectively disposed to be adjacent to the two image sensors, and the two light sources respectively emit light to the object, so that the object generates the first object image in the image region corresponding to the second section and the image region corresponding to the first section, and generates the second object image in the image region corresponding to the first section.

10. The sensing system according to claim 8, further comprising a processor electrically connected to the two image sensors, wherein the two image sensors respectively capture the first object image and the second object image, the two image sensors respectively generate a first image signal and a second image signal to the processor, and the processor judges that the first object image is a real image of the object.

11. The sensing system according to claim 8, further comprising at least one reflecting unit disposed on at least one side of the flat panel.

12. The sensing system according to claim 11, wherein the reflecting unit is a retro-reflector or a light guide bar.

13. The sensing system according to claim 8, wherein the second section is disposed facing the flat panel.

14. The sensing system according to claim 8, wherein the first section is a mirror, and the second section is a retro-reflector or a light guide bar.

15. A sensing system, comprising:
a first and a second complex reflectors, disposed on two sides of a flat panel, wherein the first and the second complex reflectors respectively comprise a first section and a second section which are stacked, the first section provides a mirror image and a real image, and the second section provides a real image; and
an image sensor, adjacent to the flat panel, wherein when the image sensor captures an image generated by an object when touching a surface of the flat panel, in the image captured by the image sensor, the object simultaneously generates a first object image in an image region corresponding to the first section and the second section of one of the first and the second complex reflectors, generates a second object image in the image region corresponding to the first section of the first complex reflector, and generates a third object image in the image region corresponding to the first section of the second complex reflector.

16. The sensing system according to claim 15, further comprising a light source, wherein the light source is adjacent to the flat panel, the light source is disposed to be adjacent to the image sensor, and the light source emits light to the object, so that the object generates the first object image in the image region corresponding to the first section and the second section of one of the first and the second complex reflectors, generates the second object image in the image region corresponding to the first section of the first complex reflector, and generates the third object image in the image region corresponding to the first section of the second complex reflector.

17. The sensing system according to claim 15, further comprising a processor electrically connected to the image sensor, wherein the image sensor captures the first object image, the second object image, and the third object image, the image sensor generates an image signal to the processor, and the processor judges that the first object image is a real image of the object.

18. The sensing system according to claim 15, further comprising at least one reflecting unit disposed on at least one side of the flat panel.

19. The sensing system according to claim 18, wherein the reflecting unit is a retro-reflector or a light guide bar.

20. The sensing system according to claim 15, wherein the two complex reflectors are disposed to be adjacent to each other, and the two complex reflectors are substantially perpendicular to each other.

21. The sensing system according to claim 15, wherein the second section is disposed facing the flat panel.

22. The sensing system according to claim 15, wherein the first section is a mirror, and the second section is a retro-reflector or a light guide bar.

23. The sensing system according to claim 15, wherein in one of the complex reflectors, the first section is located above the second section, and in the other complex reflector, the first section is located below the second section.

* * * * *